US006550010B1

United States Patent
Link, II et al.

(10) Patent No.: US 6,550,010 B1
(45) Date of Patent: *Apr. 15, 2003

(54) METHOD AND APPARATUS FOR A UNIT LOCKED AGAINST USE UNTIL UNLOCKED AND/OR ACTIVATED ON A SELECTED NETWORK

(75) Inventors: Charles M. Link, II, Roswell; Donald Lee Batson, Jr., Atlanta, both of GA (US)

(73) Assignee: BellSouth Intellectual Property Corp., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 243 days.

(21) Appl. No.: 09/497,584

(22) Filed: Feb. 3, 2000

Related U.S. Application Data

(63) Continuation of application No. PCT/US98/20428, filed on Sep. 30, 1998.

(51) Int. Cl.$^7$ .................................................. H04L 9/32
(52) U.S. Cl. ........................................................ 713/168
(58) Field of Search ................................ 455/410, 411, 455/418, 419, 420; 380/247, 249; 713/168

(56) References Cited

U.S. PATENT DOCUMENTS

| | | |
|---|---|---|
| 4,099,033 A | 7/1978 | Murray |
| 4,291,197 A | 9/1981 | Yonaga |
| 4,453,042 A | 6/1984 | Wolf et al. |
| 4,532,507 A | 7/1985 | Edson et al. |
| 4,593,155 A | 6/1986 | Hawkins |
| 4,724,537 A | 2/1988 | Monet |
| 4,736,419 A | 4/1988 | Roe |

(List continued on next page.)

FOREIGN PATENT DOCUMENTS

| | | |
|---|---|---|
| DE | 92 17 379 | 4/1993 |
| EP | 532 227 A2 | 3/1993 |
| EP | 652 681 A2 | 5/1995 |
| EP | 0 675 615 A1 | 10/1995 |
| WO | WO 97/22221 | 6/1997 |

OTHER PUBLICATIONS

Rivest, R. "The MD5 Message–Digest Algorithm." Internet RFC 1321. Apr. 1992.*

TIA IS–54 Appendix A "Dual–mode Cellular System: Authentication, Message Encryption, Voice Privacy Mask Generation, Shared Secret Data Generation, A–Key Verification, and Test Data." Feb. 1992.*

Cromwell, Robert "Privacy and Authentication for Digital RF Links", RF Cryptography, Sep. 1998, pp. 22–30.

(List continued on next page.)

*Primary Examiner*—Gail Hayes
*Assistant Examiner*—Anthony DiLorenzo
(74) *Attorney, Agent, or Firm*—Nora M. Tocups; Kilpatrick Stockton

(57) ABSTRACT

Methods and apparatus to provide for a unit that is locked against use for communications until the unit is unlocked and that may be activated on a selected network in conjunction with the unit being unlocked. A unit includes a memory for storing an unlock code specific to the unit. The unlock code is used to unlock the unit and is unbreakable without knowledge of a secret code and an algorithm. The unlock code is generated by using the algorithm with the secret code and an identifier unique to the unit. The unit also includes a control for receipt of an input code and a system identification number with the input code and the system identification number having originated from the selected network. The unit further includes a processor to effect a comparison of the input code to the unlock code, to effect an unlocking of the unit if the comparison results in a finding that the input code is substantially equal to the unlock code, and if the unlocking is effected, to effect activation of the unit on the selected network based on the system identification number.

21 Claims, 4 Drawing Sheets

U.S. PATENT DOCUMENTS

| | | | |
|---|---|---|---|
| 4,908,848 A | | 3/1990 | Hanawa |
| 4,945,556 A | | 7/1990 | Namekawa |
| 5,068,889 A | | 11/1991 | Yamashita |
| 5,159,625 A | | 10/1992 | Zicker |
| 5,276,729 A | | 1/1994 | Higuchi et al. |
| 5,297,192 A | | 3/1994 | Gerszberg |
| 5,341,426 A | | 8/1994 | Barney et al. |
| 5,373,289 A | | 12/1994 | Ichinohe |
| 5,386,468 A | | 1/1995 | Akiyama et al. |
| 5,390,252 A | | 2/1995 | Suzuki et al. |
| 5,457,737 A | | 10/1995 | Wen |
| 5,467,398 A | | 11/1995 | Pierce et al. |
| 5,481,610 A | | 1/1996 | Doiron et al. |
| 5,513,245 A | | 4/1996 | Mizikovsky et al. |
| 5,594,778 A | | 1/1997 | Schaupp, Jr. et al. |
| 5,600,708 A | | 2/1997 | Meche et al. |
| 5,603,084 A | | 2/1997 | Henry, Jr. et al. |
| 5,613,012 A | | 3/1997 | Hoffman et al. |
| 5,646,604 A | | 7/1997 | Maruyama et al. |
| 5,673,317 A | * | 9/1997 | Cooper ................... 380/249 |
| 5,742,669 A | | 4/1998 | Lim |
| 5,749,052 A | | 5/1998 | Hidem et al. |
| 5,784,464 A | | 7/1998 | Akiyama et al. |
| 5,793,866 A | | 8/1998 | Brown et al. |
| 5,794,139 A | | 8/1998 | Mizikovsky et al. |
| 5,835,858 A | | 11/1998 | Vaihoja et al. |
| 5,850,445 A | | 12/1998 | Chan et al. |
| 5,864,757 A | * | 1/1999 | Parker ................... 455/418 |
| 5,875,394 A | | 2/1999 | Daly et al. |
| 5,930,362 A | | 7/1999 | Daly et al. |
| 6,125,273 A | * | 9/2000 | Yamagishi ............... 455/411 |
| 6,130,622 A | | 10/2000 | Hussey et al. |
| 6,157,826 A | | 12/2000 | Lee |

OTHER PUBLICATIONS

European Telecommunication Standard; European digital cellular telecommunications system (Phase 2); Technical relization of the Short Message Service (SMS) Point to Point (PP) (GSM 03.40) pp. 1–103 (Oct. 1993), Publishers –European Telecommunication Standards Institute (ETSI).

European Telecommunication Standard; European digital cellular telecommunications system (Phase 2); Technical relization of the Short Message Service Cell Broadcast (GSM 03.41) pp. 1–24 (Oct. 1993), Publishers –European Telecommunication Standards Institute (ETSI).

IS–136 Revision 1A (Telecommunications Industry Association), Jun., 1996.

IS–136 Revision 2A (Telecommunications Industry Association), Jun., 1996.

Cellular–Phone Coverage Expands to 35 Countries, *The Wall Street Journal*, p. B9 (Nov. 8,1995).

Brochure entitled "PCS 1990: Tomorrow's Technology – Today," *The North American PCS 1900 Action Group (NPAG)*.

* cited by examiner

METHOD AND APPARATUS FOR A UNIT LOCKED AGAINST USE UNTIL UNLOCKED AND/OR ACTIVATED ON A SELECTED NETWORK

This appln is a continuation of PCT/US98/20428 filed Sep. 30, 1998.

FIELD OF THE INVENTION

The present invention relates generally to the field of wireless communications systems, and relates particularly to the field of activation of wireless units used in wireless communications systems.

BACKGROUND

The advance of technology in telecommunications has allowed a large segment of the population to own and to use wireless units operating on wireless communications systems. Wireless units such as cellular telephones and personal communication system (PCS) devices have been particularly popular. The delivery of service to these wireless units by wireless communications service providers is a competitive yet profitable endeavor. Service providers continue to seek ways to satisfy customers, and to improve and manage wireless service so as to continue to profit by the delivered services.

One manner in which service providers seek to better serve and to obtain customers is to provide for retail outlets where a customer may purchase a wireless unit and have it activated for use. A specific retail outlet may sell wireless units from many different manufacturers, but typically, a retail outlet has an exclusive relationship with a specific service provider. As part of this exclusive relationship, the retail outlet activates wireless units purchased at the retail outlet only on the network of the specific service provider. In other words, generally, when a customer purchases a wireless unit at a specific retail outlet, the wireless unit is activated so that wireless communications service to that wireless unit is provided by the service provider that has an exclusive relationship with the specific retail outlet. In return for this activation, the service provider typically pays the retail outlet a commission for each sale and activation of a wireless unit. This commission often is not insignificant with respect to the purchase price of a wireless unit.

Another manner in which service providers seek to obtain customers is to offer a subsidy with respect to the purchase price of a wireless unit when the wireless unit is activated on the network of the service provider. For example, a wireless unit's retail cost without subsidy may be $300. A service provider may subsidy the cost of the wireless unit by paying a commission of a significant amount such as $100 or more so long as the wireless unit is activated on the network of the service provider. Of course, the service provider anticipates that it will recoup its subsidy as a result of the long term service that is provided to the customer. This subsidization has been welcomed by many customers as a way in which to obtain a wireless unit that may otherwise be too expensive to purchase.

To purchase and activate a wireless unit at a retail outlet, a customer may select a particular brand and/or type of wireless unit. Typically, a sales clerk in the retail outlet then takes information from the customer including credit information so the customer may be qualified for wireless service from the service provider associated with the retail outlet. If the customer proves credit worthy, the sales clerk takes additional steps to activate the wireless unit to the network of the associated service provider. Once the activation is accomplished, the customer is handed his or her wireless unit and informed of his or her wireless directory number. The customer then typically may commence to make use of his or her newly activated wireless unit.

The purchase of a wireless unit at a retail outlet as explained above has advantages, but it also has disadvantages. From the customer's perspective, a disadvantage is that the purchase and activation process at the retail outlet takes a relatively long period of time. During busy periods, such purchase and activation may take up to two–three hours or more. Another disadvantage is that the purchase and activation process must be accomplished during the business hours of the retail outlet. Typically, business hours coincide with a customer's workday schedule or carry over into the early evening hours when the customer may be interested in following other pursuits. Yet another disadvantage is that during the purchase and activation process in a retail outlet the customer generally must provide a sales clerk with confidential information. A customer may have some trepidation about providing a sales clerk with confidential information such as the customer's income level, credit card numbers, etc. Thus, from a customer's perspective, the purchase and activation of a wireless unit in a retail outlet has at least the disadvantages of consuming time and energy during hours when a customer is most likely to be engaged in other pursuits and of raising security and privacy concerns.

The purchase and activation of a wireless unit in a retail outlet has disadvantages from the retail outlet's perspective as well. The retail outlet may sell other products or have other business than the wireless units. The lengthy purchase and activation process with respect to a wireless unit takes time and takes sales clerks away from the other business of the retail outlet. At times, the retail outlet may be overwhelmed with customers interested in purchasing and activating wireless units so the retail outlet cannot service all of such customers and/or the customers of its other business. Further, the retail outlet may be required to obtain special equipment and programs to sell and activate the wireless units and to keep such special equipment and programs confidential. The special equipment and programs and the confidentiality thereof may overburden the retail outlet.

The purchase and activation of a wireless unit in a retail outlet also has disadvantages from the perspective of a service provider. A disadvantage to the service provider is that it must pay a not insignificant commission to the retail outlet for each wireless unit that is purchased and activated to the network of the service provider. Another disadvantage is that the service provider must take some monitoring steps with respect to the retail outlet to assure that the purchase and activation process does not lead to abuses such as theft of confidential information relating to the wireless units or to customers.

An alternative to the purchase and activation of a wireless unit in a retail outlet is to allow a customer to activate a wireless unit that he or she has purchased at a retail outlet, through a catalog, or wherever. This alternative is welcomed by the many customers who do not want to spend the time for the lengthy purchase and activation process to be carried out in a retail outlet, and by the customers who do not desire to disclose confidential information in as unrestricted an environment as the retail outlet. But this alternative has a principal disadvantage. This disadvantage is that wireless units sold without accompanying activation are sold generally without a subsidy. In other words, a customer who desires to avoid the lengthy purchase and activation process at the retail outlet typically has to forego the savings offered by the considerable subsidy of wireless units sold in retail outlets.

It would appear that service providers could easily address this disadvantage by subsidizing all wireless units. But this is impractical. A service provider subsidizes a wireless unit by paying a commission on a wireless unit that is sold at a retail outlet because a wireless unit that is sold at a retail outlet is also activated to the network of the service provider. The service provider is generally assured it will recoup its subsidy by servicing the wireless unit. When a customer purchases a wireless unit at a place, other than a sponsored retail outlet, there is no assurance the customer will activate the wireless unit to the network of any particular service provider. The customer may take advantage of a subsidy provided by a service provider for the purchase of the wireless unit and then take advantage of an advantageous service contract from another service provider.

Some service providers have subsidized the sale of wireless units pursuant to a locked system of wireless units. To activate such a wireless unit, it must be unlocked. The process or instructions for unlocking the wireless unit are obtained from the service provider that subsidizes the purchase of the wireless unit. As part of the unlocking process, the wireless unit is activated to the network of the service provider providing the unlocking instructions. Pursuant to this locked system, the service provider offers a subsidized wireless unit to a customer, and also allows the customer to activate the wireless unit at his or her convenience. The service provider also gains from this locked system in that the service provider is able to recoup the subsidy by having the wireless unit activated to the network of the service provider thereby providing wireless service to the wireless unit.

But service providers are finding they may not be able to count on recouping the subsidy paid with respect to a locked wireless unit. The lock on the wireless unit may be circumvented by those who desire the subsidy from the service provider, but do not desire to be activated on the network of the service provider. Such circumvention may be the result of a too-wide distribution of the unlocking process of a particular type of locked wireless unit. For example, all of the same types of wireless units may be unlocked according to the same unlocking process. Once a person gains knowledge of the unlocking process, (legitimately or illegitimately), he or she may pass on the unlocking process to others or use the process to unlock other locked wireless units of the same type.

Another way to circumvent the lock of a locked wireless unit is to use a "back door" into the programming of the locked wireless unit so as to unlock the wireless unit without having to first obtain the unlocking process. A back door is an access to the programming of the wireless unit that may have been designed to allow for easy repair or service of the wireless unit. Thus, a locked wireless unit may be "locked" for all intents and purposes, but may be unlocked without resorting to the unlocking process provided by the service provider that subsidized the purchase of the wireless unit. As a result, the wireless unit may not be activated to the network of the service provider paying the subsidy and the service provider does not recoup such subsidy or otherwise gain from providing wireless service to the wireless unit.

Yet another way to circumvent the lock of a locked wireless unit is to break the lock or break the code that leads to unlocking the wireless unit. The lock or code may be broken in several different ways. The same lock or code may have been used for all of the same types and/or brands of wireless units. To break the lock or code, a person may work through one or more wireless units to find the lock or code. Even though the same lock or code may not have been used for all of the same types and/or brands of wireless units, the same pattern of unlocking a wireless unit using a code may have been used across the same types and/or brands of wireless units. To break the lock or code, a person may work through one or more wireless units to find the pattern, and thus, break the lock or code.

Therefore, there is a need for a wireless unit whose purchase may be subsidized by a service provider, which may be activated by a customer at a convenient place and convenient time through an easy process, and which process may result in activation of the wireless unit on the network of the service provider so the service provider may recoup its subsidy and otherwise derive benefits from the delivery of wireless services to the wireless unit. In addition, there is a need for a wireless unit that may be locked and that does not allow for the circumvention of the lock. In particular, there is a need for a locked wireless unit whose unlocking process is not distributed except to authorized person(s). There is also a need for a locked wireless unit that does not include a back door into its programming so that unauthorized unlocking of the wireless unit is avoided. There is a further need for a locked wireless unit whose lock cannot be broken such as through breaking a code that leads to the unlocking of the wireless unit.

SUMMARY

Generally, the present invention includes methods and apparatus as embodiments relating to a unit that may be locked against use or operation until the unit is unlocked and/or activated for use or operation on a selected network. The exemplary methods and apparatus are described by reference to a wireless unit. But the reader is advised that the reference to a wireless unit used in a wireless communications system is merely exemplary. The methods and apparatus of the present invention may be used with respect to other types of units that may be locked for various purposes and that are unlocked for use or operation in certain circumstances. Additional details regarding these other types of units are provided below in the detailed description.

Advantageously, the exemplary methods and apparatus of the present invention allow for a unit whose purchase price may be subsidized by a service provider, which may be activated by a customer at a convenient time and place through an easy process, and which process may result in activation of the unit on the network of the service provider that subsidized the purchase price of the unit. In this manner, the service provider may recoup its subsidy and otherwise derive benefits from the delivery of services to the unit. The exemplary methods and apparatus have these advantages by providing a unit that may be locked, that does not readily allow for circumvention of the lock, that may be unlocked only through the use of an unlock code that preferably originates with the service provider, and that may be activated on the network of the service provider through the unlock process of the unit.

More particularly stated, an exemplary wireless unit of the present invention is locked against use for communications or operations until the wireless unit is unlocked. Preferably, as a result of the unlocking process, the wireless unit is activated on a selected network of a service provider. The wireless unit includes a memory for storing an unlock code specific to the wireless unit. The unlock code is used in changing the wireless unit from being locked to being unlocked. The unlock code may be generated by a device other than the wireless unit, and the device may load the unlock code into the memory of the wireless unit. Alternatively, the wireless unit may generate the unlock code. Further, the unlock code may be generated by an algorithm using an identifier unique to the unit such as an electronic serial number unique to a wireless unit and using a secret code. Advantageously, the unlock code is unbreakable without knowledge of the algorithm and the secret code.

The wireless unit also includes a control for receipt of an input code and a system identification number. The input code and the system identification number may be obtained and so may have their origins in the selected network. In addition, the wireless unit includes a processor that is functionally connected to the control and to the memory. A function of the processor is to effect a comparison of the input code to the unlock code. If the comparison results in a finding that the input code is substantially equal to the unlock code, then the processor may be used to effect an unlocking of the wireless unit. If the unlocking is effected, then the processor may be further used to effect activation of the wireless unit on the selected network based on the system identification number. Advantageously, the wireless unit is locked against use for communications or use and cannot be unlocked by breaking the unlock code without the knowledge of the algorithm and the secret code. By using an unbreakable unlock code which originates with a service provider, the unlocking of the wireless unit typically results in the activation of the wireless unit on the selected network.

The present invention also includes exemplary methods to render a wireless unit useless for communications until the wireless unit is unlocked. Such a wireless unit has been loaded with an electronic serial number unique to the wireless unit. An exemplary embodiment generates an unlock code by using a cryptographic algorithm with the electronic serial number and a secret code to obtain a pseudo-random output as the unlock code. In an embodiment, the unlock code is generated through a process that includes a division operation. In particular, a secret code is divided by the electronic serial number of the wireless unit. This division yields a result and a remainder. The remainder is selected as the unlock code. In another embodiment, the cryptographic algorithm may be a cave algorithm, and the cave algorithm may be used with the electronic serial number and a secret code to obtain an unlock code. In yet another embodiment, the cryptographic algorithm may be an MD5 algorithm, and the MD5 algorithm may be used with the electronic serial number and a secret code to obtain an unlock code.

Advantageously, the use of the unlock code is specific to the wireless unit because the unlock code is generated through the use of the electronic serial number which is unique to the wireless unit. With the unlock code being specific to the wireless unit, it is much more difficult to obtain illegitimately. Knowing the unlock code of a first wireless unit does not lead to knowledge of the unlock code for a second wireless unit. Further, the unlock code is unbreakable without knowledge of the algorithm and the secret code. An unbreakable unlock code assures that the wireless unit is unlocked only through a legitimate process such as through contact with the appropriate service provider. As part of this contact with the service provider to unlock the wireless unit, advantageously, the wireless unit may be activated to the network of the service provider. The service provider then may provide service to the wireless unit, and through the payments made by the customer for the service, the service provider may recoup its investment in the subsidy of the purchase price of the wireless unit.

Once the unlock code is generated, the unlock code is loaded into the wireless unit. After loading the wireless unit with the electronic serial number and the unlock code, the wireless unit is configured so that the wireless unit can only be unlocked through input into the wireless unit of an input code substantially equal to the unlock code.

The present invention also includes computer-readable mediums on which are stored respectively computer programs for rendering a unit useless for operation until the unit is unlocked. The unit includes an identifier unique to the unit. Each of the computer programs includes instructions, which when executed by a computer, perform the steps of: obtaining a secret code; using the secret code with the identifier in an algorithm to generate an unlock code; loading the unit with the unlock code; and after loading the unit with the unlock code, configuring the unit so that the unit can only be unlocked through input into the unit of an input code substantially equal to the unlock code.

The present invention also includes exemplary methods to unlock a wireless unit that has been loaded with an electronic serial number unique to the wireless unit, that has been locked pursuant to exemplary embodiments of the present invention, and to activate the wireless unit on a selected network of a service provider. To unlock a locked wireless unit, the wireless unit is turned-on. The wireless unit receives an input code. Generally, the input code will have originated from the network of the service provider that subsidized the purchase price of the wireless unit. In response to the receipt of the input code, the wireless unit compares the input code to the unlock code. As noted, the unlock code is specific to the wireless unit and is unbreakable without knowledge of the algorithm and secret code used with the electronic serial number to generate the unlock code. If the comparison results in a determination that the input code does not substantially equal the unlock code, then the exemplary method may simply allow another attempt wherein another input code is received. As an alternative, if the input code does not substantially equal the unlock code, then the exemplary method may not allow another attempt. The wireless unit may display an error message and proceed to shut down. Other alternatives responsive to the receipt of an input code that do not substantially equal the unlock code are possible.

If the comparison results in a determination that the input code substantially equals the unlock code, then the wireless unit may complete other activation steps that may be necessary to activate the wireless unit on the network of the service provider. For example, the wireless unit may receive a system identification number (SID). As with the input code, generally the system identification number originates from the network of the service provider that subsidized the purchase price of the wireless unit. The wireless unit is unlocked so that it may be used for communications and other operations. The wireless unit may be activated on the network of the service provider, and thereafter the exemplary method ends. Thus, the wireless unit is unlocked based on the finding that the input code is substantially equal to the unlock code and the wireless unit may be activated on a network of a service provider in conjunction with the wireless unit being unlocked.

Accordingly, it is an object of the present invention to provide a wireless unit whose purchase may be subsidized by a service provider without payment of a commission to a retail outlet, which may be activated by a customer at a convenient place and convenient time through an easy process, and which process may result in activation of the wireless unit on the network of the service provider so the service provider may recoup its subsidy and otherwise derive benefits from the delivery of wireless services to the wireless unit.

In addition, it is an object of the present invention to provide a method and apparatus whereby a wireless unit may be locked so as not to allow for the circumvention of the lock. In particular, it is a further object of the present invention to provide a method and apparatus with respect to a locked wireless unit whose unlocking process is not distributed except to authorized person(s), that does not include a back door into its programming so that unauthorized unlocking of the wireless unit is avoided, and whose lock cannot be broken such as through breaking an unlock code that leads to the unlocking of the wireless unit.

That the present invention and the exemplary embodiments thereof overcome the drawbacks set forth above and accomplish the objects of the invention set forth herein will become apparent from the detailed description of the preferred embodiments to follow.

DETAILED DESCRIPTION

The present invention includes methods and apparatus as embodiments with respect to a unit that may be locked against use or operation until the unit is unlocked and/or activated for use or operation on a selected network. This description provides details with respect to exemplary methods and apparatus of the present invention. Advantageously, these exemplary methods and apparatus allow for a unit whose purchase price may be subsidized by a service provider, which may be activated by a customer at a convenient place and time through an easy process, and which process may result in activation of the unit on the network of the service provider that subsidized the purchase price of the unit. In this manner, the service provider may recoup its subsidy and otherwise derive benefits from the delivery of services to the unit. As explained in detail below, the exemplary methods and apparatus provide a unit that may be locked and that does not allow for the circumvention of the lock.

The exemplary methods and apparatus are described below by reference to any wireless unit that may be used as a communications tool in any wireless communications system. For example, a wireless unit may include a cellular telephone, mobile telephone, personal communication system (PCS) device, pager or the like. A wireless communications system may include any telecommunications system that partially or entirely conveys communications in a wireless manner such as through the use of radio waves, microwaves or other radio frequency (RF) technology including cellular systems, mobile telephone systems, PCS systems, paging systems, or the like. But the reader is advised that the reference to a wireless unit used in a wireless communications system in the context of the present invention is merely exemplary. The methods and apparatus of the present invention may be used with respect to other types of units that may be locked for various purposes and that are unlocked for use or operation in certain circumstances. For example, the methods and apparatus of the present invention may be used with respect to: a unit in a set top box or other controller associated with a cable or other broadband television service; a unit in a computer associated with an Internet or other computer service; a modem used in or with a computer or other device and associated with information delivery services; a satellite receiver; a wireless news receiver; an asymmetrical digital subscriber line (ADSL) modem; cable modem; an integrated services digital network (ISDN) telephone; or other such units.

Figure 1:
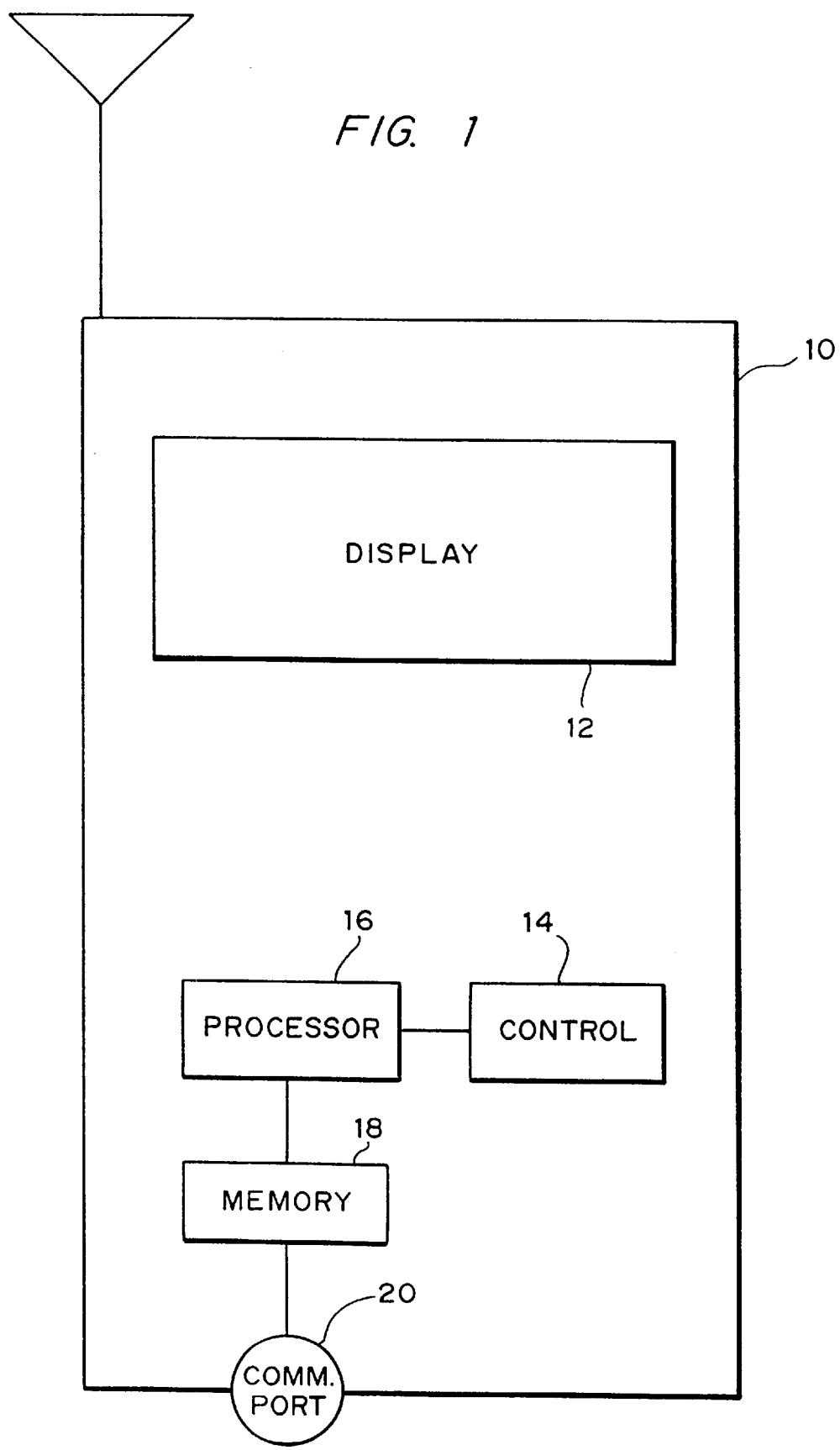
FIG. 1 illustrates an exemplary wireless unit in block diagram form.

The exemplary methods and apparatus are described below through a description of their use in connection with an exemplary wireless unit as illustrated in FIG. 1. A description of the locking of a wireless unit pursuant exemplary methods and apparatus is presented thereafter in connection with FIGS. 2–3. A description of the unlocking of a wireless unit pursuant to exemplary methods and apparatus then is presented in connection with FIG. 4. A description of the relocking of a wireless unit pursuant to exemplary methods and apparatus concludes this detailed description.

An Exemplary Wireless Unit—FIG. 1

Generally stated, an exemplary wireless unit of the present invention is locked against use for communications or operations until the wireless unit is unlocked. Preferably, as a result of the unlocking process, the wireless unit is activated on a selected network of a service provider. The wireless unit includes a memory for storing an identifier such as an electronic serial number (ESN) unique to the wireless unit. Alternatively, the identifier such as the electronic serial number may not be stored in memory, but may be otherwise associated with the wireless unit 10. The memory may be used for storing an unlock code specific to the wireless unit. The unlock code is used in changing the wireless unit from being locked to being unlocked. The unlock code may be generated by a device other than the wireless unit, and the device may load the unlock code into the memory of the wireless unit. Further, the unlock code may be generated by an algorithm using the electronic serial number and a secret code. Alternatively, the wireless unit may store the algorithm and the secret code so as to generate the unlock code using the electronic serial number and the unlock code. Advantageously, the unlock code is unbreakable without knowledge of the secret code and the algorithm.

The wireless unit also includes a control for receipt of an input code and a system identification number. The input code and the system identification number may be obtained and so may have their origins in the selected network. In addition, the wireless unit includes a processor that is functionally connected to the control and to the memory. A function of the processor is to effect a comparison of the input code to the unlock code. If the comparison results in a finding that the input code is substantially equal to the unlock code, then the processor may be used to effect an unlocking of the wireless unit. If the unlocking is effected, then the processor may be further used to effect activation of the wireless unit on the selected network based on the system identification number. Advantageously, the wireless unit is locked against use for communications or use and cannot be unlocked by breaking the unlock code without the knowledge of the algorithm and the secret code used to generate the unlock code. By using an unbreakable unlock code which originates with a service provider, the unlocking of the wireless unit typically results in the activation of the wireless unit on the selected network.

FIG. 1 illustrates an exemplary wireless unit 10 in block diagram form. For example, a representative wireless unit may be an AH 129, AH250 or AH270 wireless unit from Mitsubishi Wireless Communications, Inc., Brazelton, Ga., or similar units such as the Microtac or Startac unit manufactured by Motorola, Inc., Libertyville, Ill.; or wireless units manufactured by NEC America, Inc., Richardson, Tex.; Nokia, Tampa, Fla.; Ericsson, Inc., Research Triangle Park, N.C.; or Audiovox Cellular Communications, Hauppauge, N.Y.

The block diagram of wireless unit 10 includes a display 12 which may be used to display messages to a user. In addition, the block diagram illustrates typical elements of a wireless unit 10. Particularly, the wireless unit 10 includes a control 14 which represents the control functions generally associated with a wireless unit 10 such as the keypad of the wireless unit, the hand set, and the power control switch. Generally, it is through the control 14 that information from a customer using the wireless unit 10 is input into the wireless unit 10. For that reason, the control 14 also may be referred to as the input. As illustrated, the control 14 is connected to a processor 16, which generally controls the operation of the wireless unit 10. Generally, the processor 16 is a microprocessor or the like which operates in connection with programs or instructions. Such programs or instructions may provide for converting speech signals to digital representations, incorporation of error correcting codes, etc. As is explained below, in the exemplary embodiments, the processor through the use of programs or instructions puts into effect the locking process, the unlocking process, and/or the re-locking process with respect to the wireless unit 10. These programs or instructions may be included in the processor itself, or may be included in other media suitable for holding the programs or instructions and accessible by the control functions of the processor. For example, other such media may include a PROM, EPROM, ROM, FLASH, battery backed CMOS RAM or an EEPROM. Based on the control functions that the processor 16 executes, the processor 16 also may be referred to as a controller.

As further illustrated in FIG. 1, the processor 16 is at least functionally connected to the memory 18. The memory 18 generally is a storage or data structure for storing data and bits of information. As used in connection with the exemplary embodiments, the memory 18 may be a writable non-volatile memory such as programmable read-only memory EEPROM, battery-backed CMOS RAM, or FLASH, or any other bit storing device. The memory 18 generally retains its contents after power to the wireless unit 10 is turned off. In the exemplary embodiments, an identifier unique to the wireless unit 10 such as the electronic serial number (ESN) and an unlock code specific to the wireless unit 10 are preferably stored in the memory 18 of the wireless unit 10. In some embodiments, the secret code and/or the algorithm may be stored in memory 18. An identifier unique to the wireless unit 10 is an identifier that is not used in connection with any other wireless unit. An unlock code specific to the wireless unit 10 is an unlock code that is generated by using the electronic serial number of the wireless unit so as to make the unlock code specific to the wireless unit. The unlock code may be, but need not be, unique to the wireless unit.

As further illustrated in FIG. 1, the memory 18 is connected to a communications port 20 of the wireless unit 10. Generally, the communications port 20 is an element used to receive and/or to transmit data or information. For example, the communications port 20 may receive programming data or information that is transmitted from a computer system that is used to program the wireless unit 10 during its manufacture or at other times. Data or information received at the communications port 20 may, after receipt, be stored in the memory 18 of the wireless unit 10. For example, such data may include an identifier such as an electronic serial number (ESN) and an unlock code, and/or the secret code, and/or the algorithm. The reader is advised that the connections among and between the elements illustrated in FIG. 1 are not necessarily direct connections, but may be functional connections, and these connections are not exclusive of other connections that may exist between or among the illustrated elements or other elements of the wireless unit 10.

Figure 2:
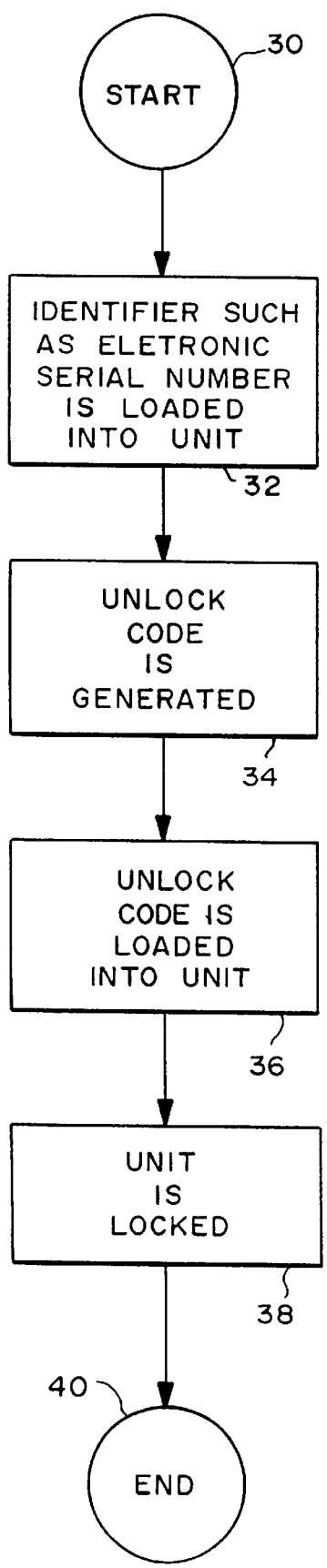
FIG. 2 is a flow chart illustrating an exemplary method of locking a wireless unit.
Figure 3:
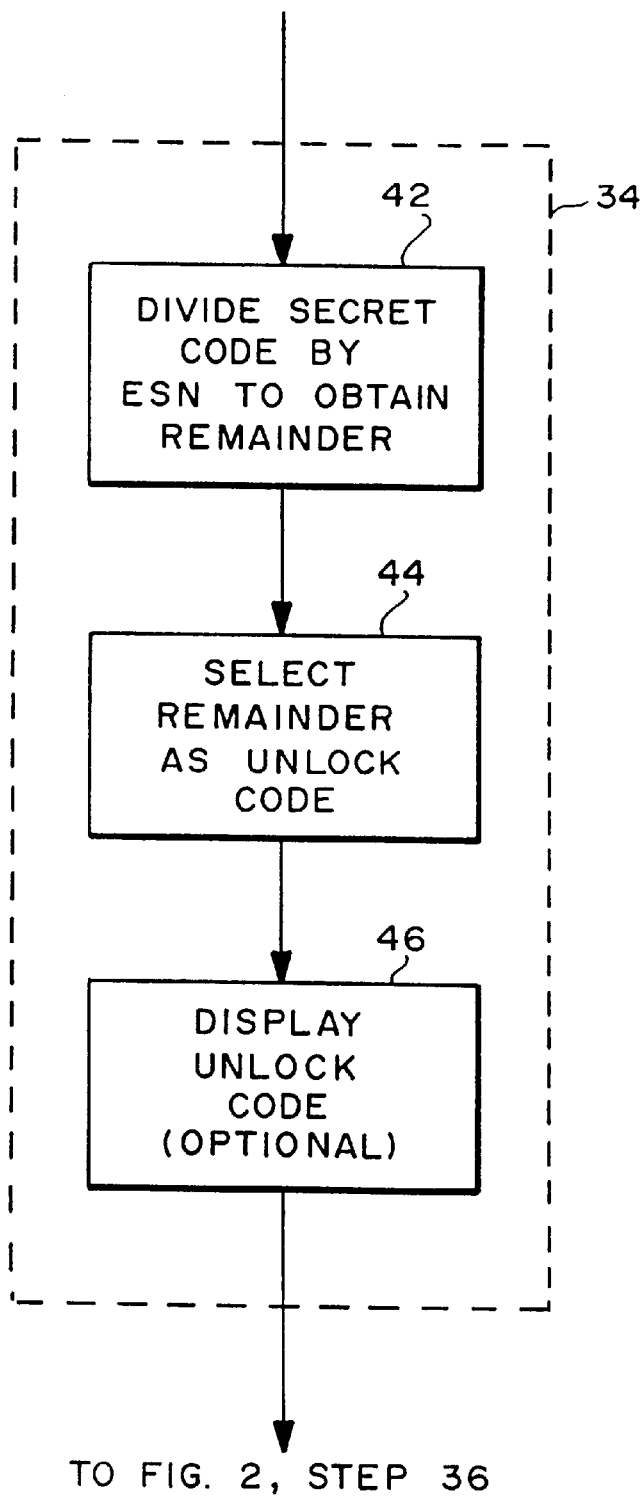
FIG. 3 is a flow chart illustrating additional steps to the exemplary method illustrated in FIG. 2.

Exemplary Method and Apparatus for Locking a Wireless Unit—FIGS. 2–3

Generally, a locked wireless unit is a wireless unit that is useless for communications. In other words, a locked wireless unit cannot be used by a customer to initiate or to receive communications. For example, a person who acquires a locked wireless unit illegitimately generally will not have the unlock code to unlock the locked wireless unit. If this person powers-up the wireless unit 10, then the display 12 on the wireless unit 10 may display a locked message such as "Carrier Lock" to indicate the wireless unit 10 is locked. If this person enters any information or signal other than the unlock code, the wireless unit 10 may continue to display the locked message or the wireless unit 10 may display an error message such as "Error Carrier Lock". Pursuant to the exemplary embodiments, a wireless unit is locked in the course of its manufacturing process. In some cases, an unlocked wireless unit may be locked or re-locked. To use the locked wireless unit, a customer unlocks the wireless unit through the use of an input code that typically may be obtained from a service provider. An exemplary method of unlocking a wireless unit is described below in connection with FIG. 4. Once the wireless unit is unlocked, the customer then may use the wireless unit to initiate or to receive communications. In this description, an overview of an exemplary method for locking a wireless unit 10 is presented through a discussion of FIGS. 2 and 3. After the overview, additional details regarding the locking of a wireless unit 10 in an exemplary environment such as a manufacturer's facilities are provided.

FIG. 2 is a flow chart illustrating an exemplary method of locking a wireless unit. Pursuant to this method, after start step 30, an identifier such as an electronic serial number is loaded into the wireless unit in step 32. As those skilled in the art understand, a unique electronic serial number is assigned to each wireless unit, and this electronic serial number is used in identifying the wireless unit in the course of providing service to the wireless unit. For units that do not include electronic serial numbers as identifiers, such units may include respectively unique indicators, designations, serial numbers or the like as identifiers. Alternatively, an identifier such as the electronic serial number may be stored or associated somewhere else than the memory 18. In step 34, an unlock code specific to the wireless unit is generated. As explained below, the unlock code is generated by an algorithm such as a cryptographic algorithm by using the electronic serial number and a secret code. The secret code may be a secret integer, a key or like device, and the use of the term "secret code" is inclusive of the term "secret integer," the term "key" and terms for like devices. By being generated by a cryptographic algorithm, the unlock code typically is a pseudo-random output of such algorithm. Additional information about an exemplary method of generation of the unlock code is provided below in the discussion of FIG. 3. Advantageously, the unlock code is unbreakable without knowledge of the algorithm and the secret code. In step 36 the unlock code is loaded into the wireless unit. After loading the wireless unit with the electronic serial number and the unlock code, in step 38 the wireless unit is locked. After locking, the wireless unit 10 can only be unlocked through input into the wireless unit 10 of an input code substantially equal to the unlock code. In step 40, the exemplary method ends.

Preferably, an unlock code specific to a wireless unit is generated by using an algorithm that uses the electronic serial number and a secret code. Generally stated, such an algorithm is a cryptographic algorithm such as a hash function, a cryptographic checksum algorithm, or message digest algorithm which yields a pseudo-random output as an unlock code. Also generally stated, such an algorithm may yield a pseudo-random output that is deterministic and highly uncorrelated. These characteristics of the unlock code that are the result of the use of an algorithm, such as a cryptographic algorithm with the electronic serial number and secret code as inputs, are factors that contribute to the unbreakability of the unlock code.

An example of a hash function that may be used as the algorithm in an exemplary embodiment is the cave algorithm such as the TIA cave algorithm. To obtain an unlock code using a cave algorithm, the electronic serial number is used with a key (inclusively referred to as a secret code herein) as inputs which yield a subset of a mixing register result as the unlock code. Another example of a hash function that may be used as the algorithm in an exemplary embodiment is the MD5 algorithm. To obtain an unlock code using an MD5 algorithm, the electronic serial number is used with a secret code as inputs which yield an MD5 result as the unlock code.

Yet another example of a hash function that may be used as the algorithm in an exemplary embodiment is described by reference to FIG. 3. The algorithm in this example uses simple division with the electronic serial number of the unit as the divisor, a secret code as a dividend, and the remainder as the unlock code. In particular, FIG. 3 is a flow chart illustrating exemplary additional steps to step 34 of generating an unlock code pursuant to the exemplary method illustrated in FIG. 2. In particular, a secret code is selected. The selection of this secret code is further described below. In step 42, the secret code is divided by an identifier such as the electronic serial number corresponding to the wireless unit 10 into which the unlock code is to be loaded. As noted, in step 42 the secret code is divided by an identifier. Such division results in a result and a remainder. In step 44, the remainder is selected as the unlock code. As noted in optional step 46, after the unlock code is generated, it may be displayed on the display 12 of the wireless unit 10. Advantageously, the use of an identifier unique to the wireless unit 10 as part of the generation process of the unlock code results in the unlock code being specific to the wireless unit 10.

Exemplary Method and Apparatus for Locking a Wireless Unit in a Manufacturing Environment Computer System Used in the Manufacturing Environment An exemplary method and apparatus for locking a wireless unit 10 in a manufacturing environment is now described. The manufacturing environment typically includes a computer system whose operation is described herein largely in terms of methods or processes. Such a method or process generally is a sequence of computer-executed steps leading to a desired result. These steps typically require physical manipulations of physical quantities. Usually, these quantities take the form of electrical, magnetic, or optical signals capable of being stored, transferred, combined, compared, divided, or otherwise manipulated. These signals are generally referred to as bits, values, elements, symbols, characters, terms, numbers, records, files, data, information, or the like. These terms correspond to physical quantities for computer operations, and these terms are conventional labels applied to physical quantities that exist within and during operations of the computer system. Operations within the computer system are often referred to by such terms as adding, comparing, moving, dividing, etc. These terms are often associated with operations performed by a person. No involvement of a person is necessary or even desirable in the context of these operations within the computer system. The operations are machine operations that may be performed in conjunction with a person who interacts with the computer system.

The computer system and the processes described herein are unrelated to and are not limited to any particular computer system or apparatus. Various types of general purpose machines may be used with the processes, programs, and methods described herein. Alternatively, or in addition, specialized machines or apparatus may be constructed to perform the processes, programs, or methods described herein. For example, dedicated computer systems with hard-wired logic or programs or applications stored in non-volatile memory may be constructed for use with the exemplary embodiments.

Generally, a computer system such as may be used in a manufacturing environment of wireless units and such as may be used in the exemplary embodiments includes a central processing unit (CPU) that operates the computer system in conjunction with a graphical user interface-based operating system to retrieve, process, store, and display data. The CPU communicates, by means of control, address, and data signals, with the operating system and with the remaining components of the computer system through a system bus. The operating system includes a set of computer programs that control the internal functions of the computer system, thereby allowing the computer to run methods or processes which may be referred to as application software or application programs. The operating system is installed in a storage device, such as a hard disk drive, a floppy disk drive, a computer disk (CD) disk drive, or a ROM chip. During initialization (boot up) of the computer system, the operating system is loaded in a system memory.

The system memory of the computer system includes an application program that is loaded from a computer-readable medium such as the hard disk drive, the floppy disk drive, or the CD disk drive. The system memory also is a computer-readable medium. The application program operates in conjunction with the operating system to provide a graphical user interface (GUI). The system memory also includes a basic input/output system (BIOS) or program with the operating system. The BIOS supplies the device-level control or support services for the primary input/output devices of the computer during the initialization process. After initialization, the BIOS accepts requests from the application programs and from the operating system running on the computer system. The BIOS performs input/output services as requested by those programs.

Peripheral ports are generally provided on the system bus for receiving and transmitting data. Such data may be received and transmitted via a user interface. The user interface includes a keyboard and an input device for entering data. An input device may include a mouse, a trackball, track pad, or any other pointing device for positioning a cursor on a computer screen. Data is graphically displayed on a monitor. Data or information also may be received or transmitted via an interface that is used to program and/or test wireless units during the course of their manufacture. Typically, such an interface receives or transmits such data or information through a connection to a communications port 20 of a wireless unit 10.

The methods or programs of loading an identifier such as an electronic serial number and locking, unlocking or re-locking a wireless unit that are used by a computer system during the manufacture or other times with respect to a wireless unit may be, and typically are, included as part of an application program used by the computer system during such manufacture or at other times. Generally, such an application program is written by the manufacturing engineers of a wireless unit manufacturer, and such an application program is written for the particular circumstances of the wireless unit manufacturer. Thus, such an application program is customized generally for a particular manufacturer. Nevertheless, the present invention may be used with such customized application programs with conventional adjustments such as may be executed by a person skilled in the art. Generally, methods and apparatus for loading an identifier such as an electronic serial number and for locking, unlocking and/or re-locking a wireless unit without the features of the present invention are known and may be used with the present invention. The reader is directed for additional information regarding wireless units and/or loading of information into a wireless unit such as an electronic serial number or identifier into a unit, and for locking, unlocking and/or relocking a unit to the following sources: Hawkins, U.S. Pat. No. 4,593,155; Doiron et al., U.S. Pat. No. 5,481,610; Higuchi et al., U.S. Pat. No. 5,276,729.

Exemplary Method and Apparatus in the Manufacturing Environment

As noted above, the exemplary embodiments of locking a wireless unit 10 may be carried out by an application program used in a computer system in a manufacturing environment to program a wireless unit 10. Pursuant to this application program which is typically stored on a computer-readable medium, a wireless unit 10 that has passed all of its functional tests arrives at a programming station in the manufacturing line for the loading of an electronic serial number into the wireless unit 10. The computer system in the manufacturing environment is connected to the communications port 20 of the wireless unit 10. An electronic serial number that is unique to the wireless unit is loaded into the wireless unit 10 through the communications port 20, and particularly, loaded into the memory 18 of the wireless unit 10. This loading of the electronic serial number may be loaded in a conventional manner pursuant to the application program of the manufacturer.

As a part of the loading of the electronic serial number into the wireless unit, the electronic serial number unique to that wireless unit is selected. Once the electronic serial number is selected for a wireless unit, then steps may be taken to generate an unlock code specific to the wireless unit. In other words, it is unnecessary to wait for the loading of the electronic serial number into the wireless unit to begin the generation of the unlock code. Rather, once the electronic serial number for a wireless unit is known or selected, then the electronic serial number may be used in the generation of the unlock code.

Generally, the unlock code is generated by an algorithm using the electronic serial number selected for the wireless unit and a secret code. Different algorithms may be used with respectively different wireless units such as the use of a first algorithm for a particular brand or model of a wireless unit and the use of a second algorithm for a different brand or model of a wireless unit. Alternatively, the same algorithm may be used for all wireless units with different secret codes for respectively different wireless units such as different brands or models of a wireless unit. As yet another alternative, different algorithms with respectively different secret codes may be used with respectively different wireless units such as different brands or models of wireless units. Other combinations of different algorithms, different secret codes, and different wireless units may be used. The use of such different combinations may be for security purposes. In any case, an organizational scheme to keep track of the algorithms and/or secret codes used amongst different wireless units is beneficial, if not essential to the manufacturer and/or service provider. Thus, a manufacturer of wireless units typically stores a table or other device to keep track of the relationships among different algorithms, different secret integers, and/or different wireless units. Of course, an electronic serial number is unique to a wireless unit and may serve as its identifier in such a table of relationships. The table of relationships may be provided to the appropriate service provider so that the service provider may provide the appropriate input code to a customer who wishes to unlock a locked wireless unit. Additional details about an exemplary method of unlocking a wireless unit are provided below in connection with FIG. 4.

Referring again to the exemplary manufacturing process, once the electronic serial number is selected for a wireless unit, the manufacturer (such as through the computer system) may consult a table of relationships to determine which algorithm to use in the generation of an unlock code. Exemplary algorithms have been previously referenced, and include cryptographic algorithms such as hash functions like the cave algorithm or the well known MD5 algorithm. Further information regarding the cave algorithms may be obtained from the following publication, which is incorporated herein by reference: EIA/TIA TR45.0.A *Common Cryptographic Algorithms,* Revision B, Jun. 21, 1995, Washington, D.C. Further information regarding the MD5 algorithms may be obtained from the following publication, which is incorporated herein by reference, "Privacy and Authentication for Digital RF Links," RF Cryptography, *RF Design,* September 1998, and from RSA Data Security, Inc.,—Redwood City, Calif. Other cryptographic algorithms also may be used such as a cryptographic checksum algorithm or a message digest algorithm. Whichever algorithm is used, it is preferred that the algorithm remain confidential for security purposes. Also, whichever algorithm is used, it is preferred that the resulting unlock code is unbreakable without knowledge of the algorithm and the secret code. An unbreakable unlock code assures that the wireless unit is unlocked only through a legitimate process such as through contact with the appropriate service provider. As part of this contact with the service provider to unlock the wireless unit, advantageously, the wireless unit may be activated to the network of the service provider. The service provider then may provide service to the wireless unit, and through the payments made by the customer for the service, the service provider may recoup its investment in the subsidy of the purchase price of the wireless unit.

The computer system runs the appropriate algorithm by using the electronic serial number of the wireless unit and a secret code. As explained above, it is conventional to load an electronic serial number unique to the wireless unit into the wireless unit. Thus, the computer system has access to the electronic serial number unique to the wireless unit for purposes of using the electronic serial number to generate the unlock code. Typically, the electronic serial number corresponds to eight (8) hexadecimal digits or eleven (11) decimal digits. The computer system may consult the table of relationships to determine which secret code to use. This determination may be made based on the selected algorithm, the wireless unit to be loaded, and/or on other factors. The use of the secret code is also for security purposes so as to maintain the confidentiality of the unlock code with respect to the wireless unit, and it is preferred that the identity of a secret code remain confidential. Also, for security purposes, it is preferred that the secret code correspond to a number (not necessarily an integer) including four, five, six, seven, . . . or n digits. The more digits included in a secret integer, typically the more difficult it is to gain knowledge of the secret integer.

As explained in connection with FIG. 3, an exemplary embodiment of the present invention generates an unlock code through use of an algorithm that is a hash function, and in particular, through a simple process that includes a division operation. In particular, the selected secret code for a wireless unit is divided by the electronic serial number of the wireless unit. This division typically results in a result and a remainder, and results in a result and a remainder if a prime number is selected as the secret code. The remainder is selected as the unlock code. For example, assume the selected secret code for a wireless unit is 1,001 and the electronic serial number for the wireless unit is 400. The division results in "2" as a result and "201" as a remainder. The "201" as the remainder is selected as the unlock code. Per this example, the unlock code of "201" includes three digits. If three digits are not enough for an unlock code, then additional zeros (0's), as desired, may be padded to the left. Alternatively, the desired number of digits in an unlock code may be achieved through the careful selection of the number of digits in a secret code because the number of digits in the electronic serial number is set at a fixed number (eight hexadecimal digits or 11 decimal digits). In addition, picking a secret code that is significantly larger than the electronic serial number yields a more uncorrelated output in this exemplary algorithm.

Advantageously, the remainder as the unlock code is specific to the wireless unit because the unlock code is generated through the use of the electronic serial number which is unique to the wireless unit. With the unlock code being specific to the wireless unit, the unlock code is much more difficult to obtain illegitimately. Knowing the unlock code of a first wireless unit does not lead to knowledge of the unlock code for a second wireless unit.

Once the unlock code is generated by the computer system, the unlock code is loaded into the wireless unit 10 through the communications port 20, and particularly, loaded in the memory 18 of the wireless unit 10. This loading of the unlock code may be accomplished in much the same manner as the loading of the electronic serial number described above. Once the unlock code is loaded, the wireless unit 10 is locked. The locking of the wireless unit 10 may be accomplished through a conventional process such as programming the wireless unit 10 to be locked through the use of the application program used by the computer system of the manufacturer of wireless units. A locked wireless unit is a unit that is useless with respect to receiving or transmitting communications. Thus, a wireless unit may be locked in any way that precludes the operations of the unit with respect to communications such as by precluding the operations of the communications port 20, the radio frequency (RF) synthesizer control, the RF circuit power, keyboard and/or display response, setting processor or processor subroutine inoperability, setting processor functionality flags, limiting power-on time for the unit or the processor, (i.e., powered-down after 3 minutes) or like operations. To lock a unit, the processor 16 or the manufacturer's computer system may effect the inoperability of the communications function of the unit and set a flag or other indicator in the wireless unit to indicate its locked status. To unlock the unit, (once an input code is found to substantially equal the unlock code), the processor 16 may effect the operability of the inoperable communications function and unset the flag or other indicator to indicate the unit's unlocked status.

Further, the wireless unit may be locked as explained above, by the referenced application program, or by input through its control or keyboard. For example, some existing wireless units may be placed into a locked mode if an obscure or unnatural keyboard sequence is input into the wireless unit. An obscure or unnatural keyboard sequence is a sequence of keyboard inputs that is unlikely to be encountered in day-to-day use. An example of such a keyboard sequence may be to press the "ON" key to sequence the wireless unit into a power-up cycle while holding pushbuttons for digits "1," "3," "5," and "CLR." This sequence does not occur in normal wireless use and requires considerable coordination to activate. The receipt of such a keyboard sequence may result in the inoperability of a communication function of the wireless unit so as to lock the unit.

As part of the locking process of the wireless unit 10, the wireless unit 10 may be further programmed to respond under appropriate circumstances so that the wireless unit 10 may be unlocked for use and operation. Typically, such programming is included as part of or accessible to the processor 16 of the wireless unit 10.

After the wireless unit 10 is locked, and then packaged, generally the wireless unit 10 is ready for sale or delivery to a distribution or retail outlet. As such, the wireless unit 10 is delivered to the distribution or retail outlet as locked against use or operation. The wireless unit 10 cannot be used until it is unlocked as described below.

As noted above, the manufacturer may retain information on the relationships between different algorithms, different secret codes, and/or different wireless units in a table of relationships or other device. Such a table also may include entries for the unlock codes that have been generated for the various wireless units that have been manufactured. Alternatively, the manufacturer may keep the correspondence between any particular wireless unit (typically by its electronic serial number) and its unlock code in a separate table or other storage. At some point, the table of relationships or other information on the relationship between a wireless unit and its unlock code is passed on to a service provider or other entity that may provide information on unlocking such locked wireless units. For example, a service provider may have ordered a certain number of wireless units locked pursuant to exemplary embodiments of the present invention from the manufacturer for distribution or sale at a subsidized purchase price at retail outlets. As part of the order of the locked wireless units, the manufacturer provides the service provider with information on the relationship between each of the wireless units in the order and a respectively unique unlock code for each wireless unit. The service provider uses this information as the service provider is contacted by customers seeking to unlock wireless units as is explained below.

Figure 4:
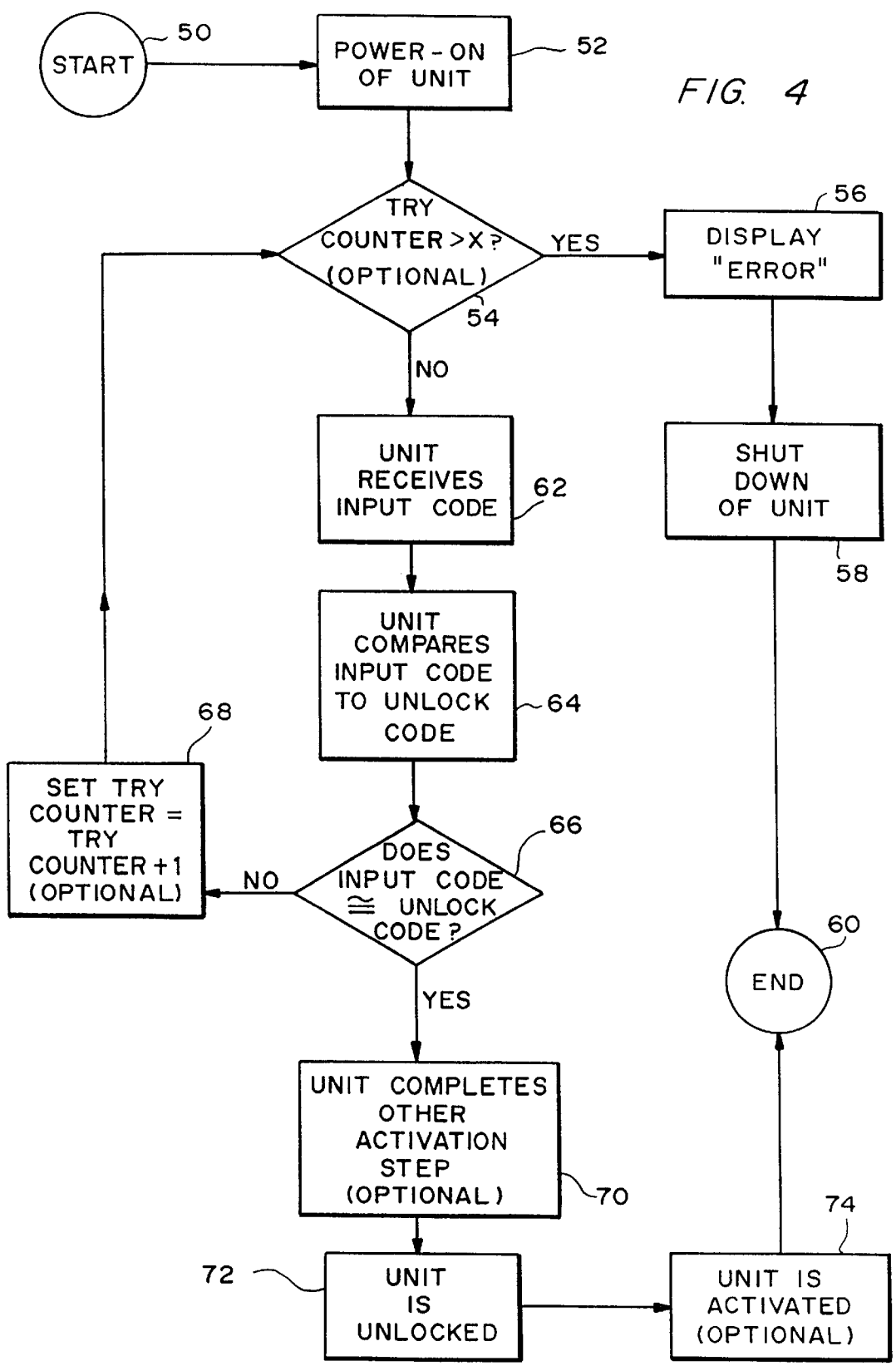
FIG. 4 is a flow chart illustrating an exemplary method of unlocking a wireless unit.

Exemplary Method and Apparatus of Unlocking a Wireless Unit—FIG. 4

Overview

A customer who obtains a unit such as a wireless unit that is locked and includes features pursuant to exemplary embodiments of the present invention may take steps to unlock the unit and to activate the wireless unit on a selected network. In this description, an overview of an exemplary method for unlocking a unit is presented through a discussion of unlocking a wireless unit presented in connection with FIG. 4. After the overview, additional details regarding the exemplary method of unlocking of a wireless unit 10 in an exemplary environment are provided.

FIG. 4 is a flow chart illustrating an exemplary method of unlocking a unit. Generally, the operations of unlocking the wireless unit 10 are carried out by or effected by the processor 16 of the wireless unit 10 and/or by the processor 16 acting in concert with information or programming stored in the memory 18 or other components of the wireless unit 10. As noted above, programming for the unlocking process typically is loaded into the wireless unit 10 (into the processor 16 or accessible to the processor 16) during the manufacturing process of the wireless unit 10. For brevity, the unlocking process is described as the wireless unit 10 acting responsively to certain inputs through control 14 of the wireless unit 10.

Referring to FIG. 4, after start step 50, the unit is turned on or powered-on such as through input to the control 14 of a wireless unit 10. Once it is turned-on, the wireless unit 10 determines that it is locked against use or operation. In an exemplary embodiment, the wireless unit 10 keeps track of the number of times that an attempt or try is made to unlock the wireless unit. If a selected number of attempts or tries are made to unlock the wireless unit 10, for example twenty-five (25) or fifty (50) attempts, then after the twenty-fifth or fiftieth attempt or try the wireless unit turns itself off and may not allow itself to be powered-on again. Pursuant to this exemplary embodiment, and as illustrated in FIG. 4, after the unit is powered-on, in optional check step 54 the wireless unit 10 then may check to see whether the selected number of attempts or tries to unlock the wireless unit 10 has been made. If the counter such as the "try counter" that keeps track of the number of attempts or tries exceeds the selected number, then in step 56 the wireless unit 10 displays "ERROR" or other similar message on its display 12. In step 58, the wireless unit 10 shuts itself off or down by powering off, and in step 60 the exemplary method ends. As noted, in an exemplary embodiment, a locked wireless unit that has suffered through a selected number of unlock attempts shuts itself down so that it may not be powered-on again.

Referring again to optional check step 54, if the try counter does not exceed the selected number, then in step 62 the wireless unit 10 receives an input code through the control 14 of the wireless unit 10. Generally, the input code will have originated from the network of the service provider that subsidized the purchase price of the wireless unit 10. In response to the receipt of the input code, in step 64 the wireless unit 10 compares the input code to the unlock code that the wireless unit 10 has stored in memory 18. As noted, the unlock code is specific to the wireless unit 10 and is unbreakable without knowledge of the algorithm and a secret integer. In check step 66, the wireless unit 10 checks whether the input code substantially equals the unlock code. Preferably, the input code substantially equals the unlock code when the input code matches the unlock code. But "substantially equal" may also include a less than identical match. In addition, "substantially equal" also may include the circumstance where the input code has a correspondence or other relationship to the unlock code.

If the check in step 66 results in a determination that the input code does not substantially equal the unlock code, then in an exemplary embodiment, the method proceeds to optional step 68 wherein the try counter is set to "try counter+1". In other words, another unsuccessful attempt or try at unlocking the wireless unit 10 is noted. Pursuant to this exemplary embodiment, the method then returns to optional check step 54 (described above) to check whether the try counter is greater than a selected number of attempts or tries. Alternatively, if the input code does not substantially equal the unlock code, then the exemplary method may simply allow another attempt or try such as by returning to step 62 (described above) wherein an input code is received. As yet another alternative, if the input code does not substantially equal the unlock code, then the exemplary embodiment may not allow another attempt or try and may proceed directly to step 56 (described above) wherein an error message is displayed and the wireless unit 10 proceeds to shut down. Another alternative is to cause the wireless unit to enter a comatose state wherein the wireless unit does not respond to any keyboard entries for some period of time, like three (3) minutes. Removing power by removing the battery would have no effect on the timer. This would discourage sequential or random attacks. Other alternatives responsive to the receipt of an input code that do not substantially equal the unlock code are possible.

If the check in step 66 results in a determination that the input code substantially equals the unlock code, then in optional step 70 the unit may complete other activation steps that may be necessary to activate the wireless unit 10 on the network of the service provider. For example, the wireless unit 10 may receive a system identification number (SID) through the control 14 of the wireless unit 10. As with the input code, generally the system identification number originates from the network of the service provider that subsidized the purchase price of the wireless unit 10. In step 72, the wireless unit 10 is unlocked so that it may be used for communications and other operations. In optional step 74, the wireless unit 10 may be activated on the network of the service provider, and thereafter in step 60 the exemplary method ends. Thus, the wireless unit 10 is unlocked based on the finding that the input code is substantially equal to the unlock code and the wireless unit 10 may be activated on a network of a service provider in conjunction with the wireless unit 10 being unlocked.

Exemplary Method and Apparatus in A Customer/Service Provider Environment

Typically, a customer will have obtained a locked wireless unit at a retail outlet. The packaging or other information accompanying the locked wireless unit generally informs the customer to contact a particular service provider (and usually the service provider that subsidized the purchase price of the wireless unit) to unlock the wireless unit. Generally, the customer takes the locked wireless unit at a convenient time to a convenient place that includes a telephone (or other communications device). Such a convenient place may be his or her home or office. The customer uses the telephone (not the wireless unit) to call a wireless activation center (WAC) of the service provider. Typically, credit and other billing information is exchanged and the customer agrees to a subscription for service from the service provider for his or her wireless unit 10. The WAC requests and receives the electronic serial number of the wireless unit 10 of the customer. If the customer has not already done so, the WAC advises the customer to charge the battery on the wireless unit 10 and to power-on the wireless unit 10. Once the wireless unit 10 is turned-on, preferably it conducts a check to determine whether more than a selected number of attempts or tries has been made to unlock the wireless unit 10. As explained above, if the selected number of attempts or tries has been exceeded, then the wireless unit 10 may display an error message and may turn itself off. In this case, the WAC may inform the customer to return the wireless unit to the appropriate location such as the retail center where the wireless unit was purchased or some other location.

If the check to determine whether more than a selected number of attempts or tries has been exceeded determines that the selected number has not been exceeded, then a message may appear on the display 12 of the wireless unit 10. The WAC typically requests the customer to read the message aloud so the WAC may use the information. For example, after initial power-up, the wireless unit 10 may display a message that states "Enter Code A". This message may be the result of programming in the wireless unit pertaining to its brand or model so as to identify to the WAC the appropriate algorithm and/or secret code to use in determining the input code to be provided to the customer. In other words, rather than relying on a table of relationships, the WAC of the service provider may generate an input code based on information provided by the customer such as the electronic serial number and a message corresponding to the appropriate algorithm to be used by the WAC to generate the input code. Of course, the WAC typically supplies the secret code for use with the algorithm and the electronic serial number.

The WAC may generate an input code in a similar manner to the manner used by the manufacturer to generate the unlock code. In particular, the WAC may generate the input code based on an appropriate algorithm, the electronic serial number of the customer's wireless unit 10, and a secret code. As noted, the information needed by the WAC to generate the input code for a particular wireless unit may be supplied by a table of relationships or other information provided by the manufacturer. Alternatively, the WAC may have a table of input codes already generated and waiting for calls from customers. For example, the WAC may generate an input code for a particular wireless unit by simply checking for the wireless unit's electronic serial number in a table that links electronic serial numbers to the appropriate input codes.

The WAC provides the customer with an input code, and the customer inputs the input code through the control 14 of the wireless unit 10. Generally, the input code may be limited to a relatively small number of digits such as 4, 5, 6, 7 . . . 10 digits so that it is easy for the customer to enter without making a mistake. On the other hand, it is better for security purposes for the input code to have a large number of digits so that it cannot be easily guessed or otherwise illegitimately obtained. If the input code is incorrect, in an exemplary embodiment,the try counter is advanced. If the try counter then exceeds the selected number of attempts or tries, the wireless unit 10 displays an error message and may turn itself off as explained above. Alternatively, if the input code is incorrect, other steps may be taken as explained above in connection with steps 66, 68, FIG. 4.

If the input code is correct, then a message may appear on the display 12 of the wireless unit 10. For example, the message may prompt the customer for information with respect to the further activation of the wireless unit 10. The message "ENTER SID" may appear on the display 12. Following the display of this message, the customer may engage in a conventional further exchange of information with the WAC so as to accomplish the activation of the wireless unit on the network of the service provider. Once the wireless unit 10 is activated, then it enters a normal operating mode and the customer may use it for wireless communications.

Advantageously, the exemplary unlocking process is simple for the customer, who simply calls the WAC of the appropriate service provider and engages in an exchange of information with minimal input of data or information into the wireless unit 10. The exemplary unlocking process is also simple with respect to the wireless unit, which simply stores an unlock code that is used in a simple comparison process with respect to an input code input by the customer. In addition, the unlocking process is simple with respect to the service provider, which simply maintains some correspondence information such as a table of relationships with respect to wireless units and their input codes that may be supplied to customers as they call with other information that is exchanged in the activation process. By tying the receipt of the input code that unlocks the wireless unit to the activation process, the customer and communications service to that customer are tied to the service provider that provided the subsidy for the purchase price of the wireless unit 10. Advantageously, through the provision of service to the customer and receipt of payment therefor, the service provider may recoup its subsidy of the purchase price of the wireless unit as well as derive further income from serving the customer.

Exemplary Method and Apparatus for Re-locking a Wireless Unit

In some circumstances a wireless unit that has been unlocked may be re-locked so that it is locked against further use or operation. Re-locking of a wireless unit may occur as a result of the return of a wireless unit to a service provider or manufacturer such as in the case of a defective wireless unit, or a customer's change of mind, or inability to qualify or afford the wireless service for the unit. Typically, the re-locking process may take place at a service center of the service provider, or possibly, at a service center of the manufacturer.

To re-lock a wireless unit, the wireless unit generally includes programming that responds to re-lock commands such that the wireless unit is locked after the re-locking process. Such programming may have been loaded into the wireless unit when it was manufactured or otherwise loaded with programming relating to the locking and/or unlocking processes of the exemplary embodiments of the present invention. In addition, it is preferred that the re-locking of a wireless unit result in the wireless unit being locked so that it may be unlocked only through input of an input code that is substantially equal to an unlock code which has been previously programmed into the wireless unit. In other words, the relocking process generally does not include programming the wireless unit with a new unlock code. Rather, the re-locking process generally re-activates the locked status of the wireless unit 10 such as the status the wireless unit 10 had after it left manufacturing process described above.

Generally, to re-lock a wireless unit such as described in the previous paragraph, the wireless unit 10 is powered-up or turned on. Through the control 14 of the wireless unit 10, the wireless unit 10 receives a signal to enter a re-lock mode. The signal may be a re-lock sequence that generally is an obscure sequence of keystrokes. After the wireless unit 10 enters the re-lock mode, then a re-lock code may be entered into the wireless unit 10 through its control 14. A re-lock code typically is a series of alpha-numeric digits that are recognized by the programming of the wireless unit 10 so that the wireless unit is locked against further use or operation. In an exemplary embodiment, after receipt of a re-lock code, the wireless unit 10 may check whether the unlock code stored in memory 18 of the wireless unit 10 is intact. For example, the wireless unit 10 may check whether any tampering or other actions may have affected the use of the unlock code with respect to unlocking the wireless unit 10 once it is locked. This precaution may prevent the locking of a wireless unit 10 that does not hold an unlock code in memory or a defective unlock code in memory. If the unlock code is intact, then the wireless unit is locked and the try counter may be cleared. If the unlock code is not intact, then other steps with respect to the wireless unit may be taken. For example, a message may be displayed on the display 12 of the wireless unit 10. Alternatively, the wireless unit 10 may power-down without being locked.

In an alternate embodiment, a wireless unit may be re-locked through information or instructions such as the re-lock code. This information may be input into the wireless unit through its communications port.

As noted, once a wireless unit 10 is re-locked pursuant to the exemplary relocking process described above, the wireless unit 10 is locked against use or operation. The wireless unit 10 may be unlocked through the input of an input code that is substantially equal to an unlock code stored in the memory 18 of the wireless unit 10.

CONCLUSION

Given the foregoing disclosure of the exemplary embodiments, other embodiments of the present invention will suggest themselves to those skilled in the art. Therefore, the scope of the present invention is to be limited only by the claims below.

We claim:

1. A unit that is locked against use for communications until the unit is unlocked, comprising:
   memory for storing an unlock code with the unlock code being generated from an algorithm including division of a secret code by an identifier of the unit so as to result in a remainder;
   a control for receipt of an input code; and
   a processor being functionally connected to the control and to the memory to effect a comparison of the input code to the unlock code, and to effect an unlocking of the unit if the comparison results in a finding that the input code is substantially equal to the unlock code.

2. The unit of claim 1 wherein the identifier comprises an identifier unique to the unit.

3. The unit of claim 1 wherein the identifier comprises an electronic serial number of the unit.

4. The unit of claim 1 wherein the control is operative to receive the input code and a system identification number from a selected network; and wherein the processor is operative, after the unlocking of the unit, to effect activation of the unit on the selected network based on the system identification number.

5. The unit of claim 1 wherein the algorithm comprises a cryptographic algorithm; and wherein the unlock code comprises a pseudo-random output generated by the cryptographic algorithm.

6. The unit of claim 1 wherein the algorithm comprises a cave algorithm; and wherein the unlock code comprises a subset of mixing register result generated by the cave algorithm.

7. The unit of claim 1 wherein the algorithm comprises an MD5 algorithm; and wherein the unlock code comprises a subset of an MD5 result.

8. The unit of claim 1 wherein the algorithm used to generate the unlock code is run by a device other than the unit; and
   wherein the unlock code is loaded by the device in the memory.

9. The unit of claim 1 wherein the unit comprises a wireless unit; and wherein the identifier comprises an electronic serial number of the wireless unit.

10. With respect to a unit loaded with an identifier, a method to render the unit useless for communications until the unit is unlocked, the method comprising:
    generating an unlock code by using an algorithm to
      i. divide a secret code by the identifier to obtain a remainder, and
      ii. select the remainder as the unlock code;
    storing the unlock code in the unit; and
    configuring the unit to be unlocked through input into the unit of an input code substantially equal to the unlock code,
    whereby the unit cannot be used for communications until the unit is unlocked with the input of the input code substantially equal to the unlock code.

11. The method of claim 10 wherein generating the unlock code comprises causing the unit to generate the unlock code by using the algorithm to divide the secret code by the identifier to obtain a remainder, and to select the remainder as the unlock code.

12. The method of claim 10 wherein the algorithm comprises a cave algorithm; and wherein generating the unlock code comprises using the cave algorithm.

13. The method of claim 10 wherein the algorithm comprises an MD5 algorithm; and wherein generating the unlock code comprises using the MD5 algorithm.

14. The method of claim 10, further comprising:
    receiving a system identification number from a selected network; and
    based on unlocking of the unit, activating the unit on the selected network.

15. With respect to a unit that has been loaded with an identifier and that has been locked, a method to unlock the unit for communications, comprising:
    generating an unlock code using an algorithm including division of a secret code by an identifier so as to result in a remainder used as the unlock code;
    receiving an input code;
    comparing the input code to the unlock code; and
    unlocking the unit if the input code is substantially equal to the unlock code.

16. The method of claim 15, further comprising:
    receiving a system identification number from a selected network; and
    based on the unlocking of the unit, activating the unit on the selected network.

17. The method of claim 15, wherein receiving the input code comprises receiving the input code from a selected network; and further comprising:
    receiving a system identification number from the selected network; and
    based on the unlocking of the unit, activating the unit on the selected network.

18. The method of claim 15, wherein generating the unlock code comprises causing the unlock code to be generated by a device other than the unit.

19. A computer-readable medium on which is stored a computer program for rendering a unit useless for operation until the unit is unlocked, the unit having an identifier unique to the unit, the computer program comprising instructions, which when executed by a computer perform the steps of:
   obtaining a secret code;
   using the secret code with the identifier in an algorithm to generate an unlock code by dividing the secret code by the identifier to obtain a remainder, and selecting the remainder as the unlock code;
   loading the unit with the unlock code; and
   configuring the unit so that the unit can only be unlocked through input into the unit of an input code substantially equal to the unlock code.

20. The computer-readable medium of claim 19 wherein the algorithm comprises a cave algorithm; and wherein using the secret code with the identifier in the algorithm to generate the unlock code comprises using the secret code with the identifier in the cave algorithm to generate the unlock code.

21. The computer-readable medium of claim 19 wherein the algorithm comprises an MD5 algorithm; and wherein using the secret code with the identifier in the algorithm to generate the unlock code comprises using the secret code with the identifier in the MD5 algorithm to generate the unlock code.

* * * * *